United States Patent
Ilkbahar et al.

[11] Patent Number: 6,154,845
[45] Date of Patent: Nov. 28, 2000

[54] POWER FAILURE SAFE COMPUTER ARCHITECTURE

[75] Inventors: Alper Ilkbahar, San Jose; Christopher Cheng, Sunnyvale, both of Calif.

[73] Assignee: Intel Corporation, Santa Clara, Calif.

[21] Appl. No.: 09/151,484

[22] Filed: Sep. 11, 1998

[51] Int. Cl.[7] ............................... G06F 1/26; G06F 1/30
[52] U.S. Cl. ............................................ 713/300; 714/22
[58] Field of Search ................................. 714/14, 22, 10, 714/3; 713/300, 340; 710/100; 327/540, 530; 326/80; 361/686, 91.5

[56] References Cited

U.S. PATENT DOCUMENTS

| | | | |
|---|---|---|---|
| 4,228,496 | 10/1980 | Katzman et al. | 364/200 |
| 4,581,551 | 4/1986 | Campbell, Jr. | |
| 4,586,179 | 4/1986 | Sirazi et al. | 371/12 |
| 4,639,864 | 1/1987 | Katzman et al. | 364/200 |
| 5,036,455 | 7/1991 | Atwood | 364/200 |
| 5,317,752 | 5/1994 | Jewett et al. | 395/750 |
| 5,933,025 | 8/1999 | Nance et al. | |

OTHER PUBLICATIONS

PCT Search Report for International application No. PCT/US99/20550, mailed Dec. 23, 1999.

*Primary Examiner*—Gopal C. Ray
*Attorney, Agent, or Firm*—David J. Kaplan

[57] ABSTRACT

A component powered by a first power supply activates a driving signal. The driving signal indicates that both a second power supply voltage has a magnitude greater than a reference voltage and an enable signal is active. A driver transfers the output signal when the driving signal is active. In a multi-processor computer system implementation, each of two processor cores are independently supplied power by each of two core power supplies while a single I/O power supply supplies power to the I/O rings of both processors. Each processor includes a bus isolation circuit to prevent its respective processor from loading the system bus in the event that a core power supply fails.

22 Claims, 2 Drawing Sheets

POWER FAILURE SAFE COMPUTER ARCHITECTURE

FIELD OF THE INVENTION

The present invention relates to computer systems and more particularly to keeping a computer system operational after a power supply failure.

BACKGROUND

Computer systems, from small handheld electronic devices to medium-sized mobile and desktop systems to large servers and workstations, are becoming increasingly pervasive in our society. Computer systems typically include one or more processors. A processor manipulates and controls the flow of data in a computer. Typically, if a processor fails, the computer system fails.

Processor failure may occur due to, for example, failure of one or more power supplies that supply power to the processor. Power supply failure may be the result of a manufacturing defect, improper operation, normal end of life failure, or it may simply be the result of a user turning off the power supply to, for example, service the computer system. When a power supply fails, the magnitude of its supply voltage may fall below the minimum nominal operating voltage required by the processor. Alternatively, power supply failure may result in the magnitude of the supply voltage rising above the maximum nominal operating voltage of the processor. In either case, the processor may fail, bringing down the entire computer system.

SUMMARY OF THE INVENTION

A component powered by a first power supply activates a driving signal. The driving signal indicates that both a second power supply voltage has a magnitude greater than a reference voltage and an enable signal is active. A driver transfers an output signal when the driving signal is active.

Other features and advantages of the present invention will be apparent from the accompanying drawings and the detailed description that follows.

BRIEF DESCRIPTION OF THE DRAWINGS

The present invention is illustrated by way of example and not limitation in the figures of the accompanying drawings in which like references indicate similar elements and in which.

DETAILED DESCRIPTION

In accordance with an embodiment of the present invention, a multiprocessor computer system includes two or more processors that communicate with each other, as well as with the rest of the computer system, via input-output (I-O) signals across a system bus. The computer system includes an I-O power supply that supplies power to each processor of the system. The I-O power supply provides the power used by the processors to drive the I-O signals on the system bus. The computer system additionally includes core power supplies, one for each processor of the multiprocessor system. The core power supplies provide the power used by the processor cores to perform signal processing.

Each processor of the multiprocessor system includes a bus isolation circuit. A bus isolation circuit helps to prevent its associated processor from causing the entire multiprocessor computer system to fail after a core power supply failure. Without bus isolation circuitry, there is a danger that failure of one processor, due to, for example, failure of its core power supply, may load the system bus by, for example, grounding the system bus. Grounding the system bus prevents other operational processors from communicating with one another via the system bus, thereby bringing down the entire computer system.

A bus isolation circuit includes a logic gate and a driver, both of which are powered by the I-O power supply. The logic gate activates a driving signal that indicates that both the core power supply to the processor is operational and an enable signal from the processor core is active. The driver then transfers an output signal from the processor core to the system bus when the driving signal is active.

A more detailed description of embodiments of the present invention, including various configurations and implementations, is provided below.

Figure 1:
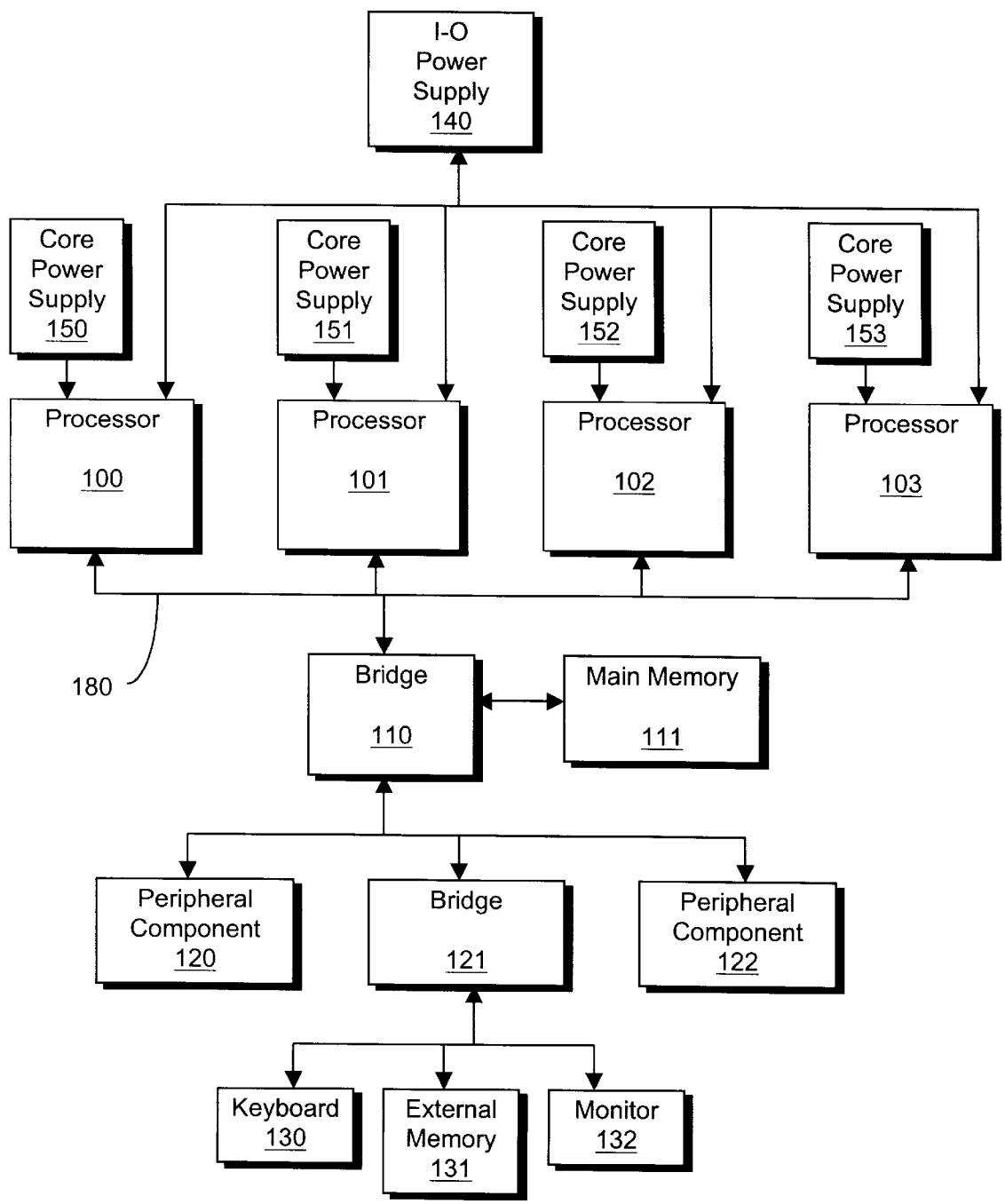
FIG. 1 is a multiprocessor computer system formed in accordance with an embodiment of the present invention.

FIG. 1 is a multiprocessor computer system formed in accordance with an embodiment of the present invention in which I-O power supply 140 provides I-O power to processors 100–103. Core power supplies 150–153 provide core power to processors 100–103, respectively. Processors 100–103 are coupled to each other and to bridge 110 via system bus 180. Bridge 110 is used to couple system bus 180 to main memory 111 and to a peripheral bus that includes peripheral components 120, 122, and secondary bridge 121. Secondary bridge 121 couples the peripheral bus to a secondary bus including keyboard 130, external memory 131, and monitor 132.

In accordance with one embodiment of the present invention, the computer system of FIG. 1 is a server system. For this embodiment, multiple client keyboards and monitors are coupled to the system. For another embodiment, the system of FIG. 1 is a workstation. External memory 131 may include a hard drive. Peripheral components 120 and 122 may include graphics accelerators, video input devices, audio input devices, or other digital signal processors.

Each of processors 100–103 of FIG. 1 includes a region that performs the majority of the signal processing for the processor, including the storing of data in registers and on-chip caches, instruction decoding, scheduling, and execution. This region is referred to as the processor core. Each of processors 100–103 additionally includes a region that performs the majority of I-O signal driving, including electrostatic discharge (ESD) protection circuitry for I-O ports of the processors, output signal boosting and input signal conditioning. This region is referred to as the processor I-O ring.

System bus 180 of FIG. 1 is coupled to the I-O ports of processors 100–103. I-O power supply 140 is coupled to the I-O rings of the processors, and core power supplies 150–153 are coupled to the cores of the processors through power supply input ports on the processors. For one embodiment of the present invention, the I-O power supply voltage is equal to the core power supply voltage. For another embodiment of the present invention, the I-O power supply voltage is greater than the core power supply voltage. For one embodiment, each of power supplies 140 and 150–153 are independently operational. For an alternate embodiment, the I-O power supply is additionally coupled to the bridge of the computer system.

The average power consumed by the core of each of processors 100–103 of FIG. 1 is typically much greater than the average power consumed by the I-O rings of the processors. For this reason, the demand on core power supplies 150–153 is greater than the demand on I-O power supply 140. As a result, core power supplies 150–153 are more susceptible to failing. When a core power supply fails (becomes no longer operational), its associated processor fails as well. To prevent a failed processor from causing the entire computer system to fail, each of processors 100–103 include a bus isolation circuit.

A bus isolation circuit isolates system bus 180 from the processor core such that core power supply failure does not cause system bus 180 to fail. For example, a bus isolation circuit within processor 100 may prevent processor 100 from loading (e.g. uncontrollably grounding or driving) system bus 180. In this manner, even if processor 100 fails due to, for example, failure of core power supply 150, processors 101–103 may still communicate along system bus 180, as long as their respective core power supplies are operational. Thus, the computer system remains operational despite one or more processors failing. Note that for some embodiments of the present invention, the system bus may fail upon failure of a core power supply not because the system bus becomes loaded but because the failed processor causes a system-wide error. For these embodiments, a system with a failed core power supply may again become operational after rebooting the computer system.

Figure 2:
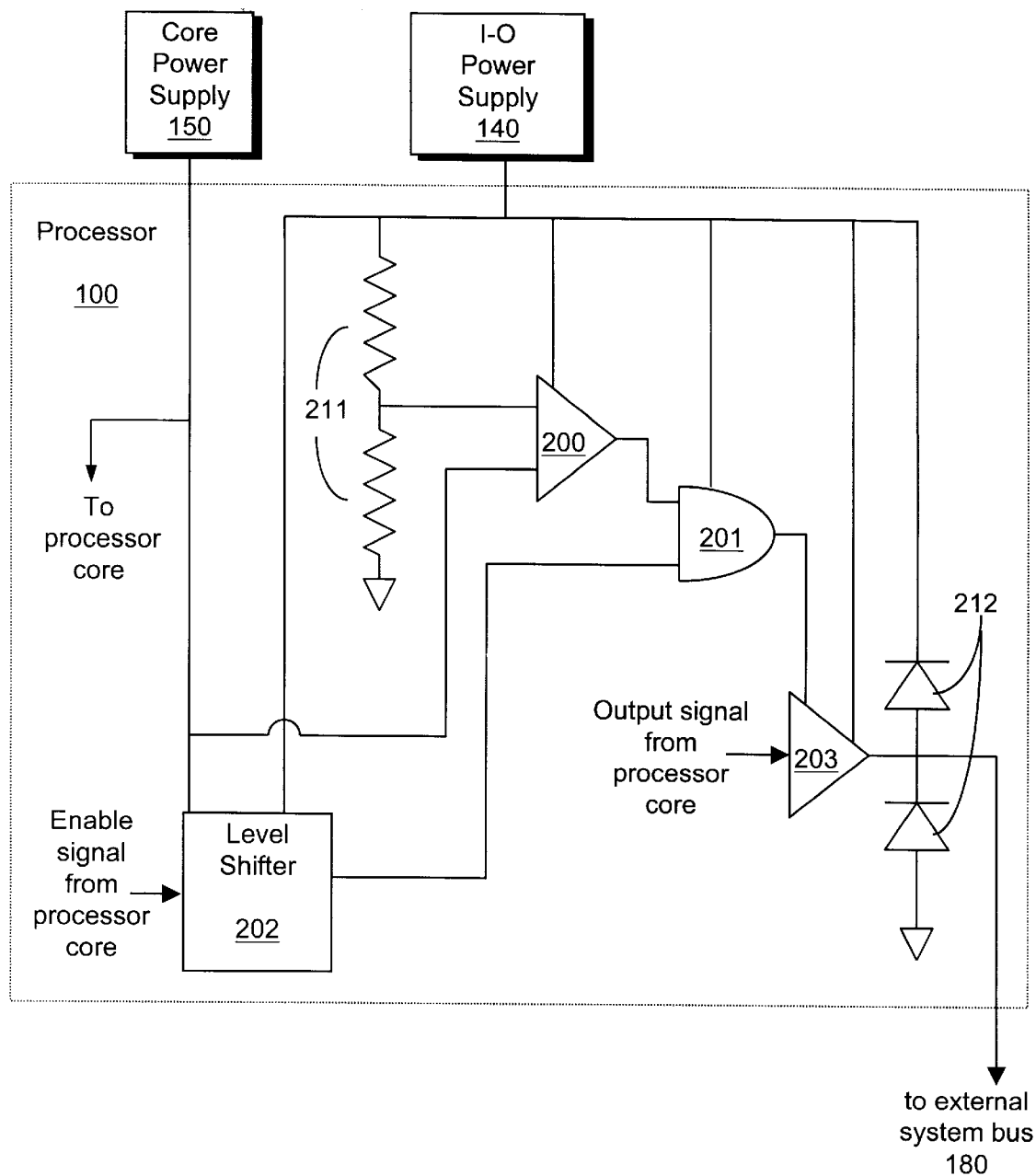
FIG. 2 is a circuit within a processor of FIG. 1 formed in accordance with an embodiment of the present invention.

FIG. 2 shows a bus isolation circuit within processor 100 in accordance with an embodiment of the present invention. Core power supply 150 is coupled to one or more power supply input ports (such as an electrically conductive pin or pad) of processor 100. Core power supply 150 supplies power to the processor core of processor 100, level shifter 202, and an input of comparator 200, each of which is coupled to one or more power supply input ports of the processor. I-O power supply 140 is also coupled to one or more power supply input ports of processor 100. I-O power supply 140 supplies power to level shifter 202, resistor ladder 211, comparator 200, AND gate 201, output driver 203, and ESD protection device 212, each of which is coupled to one or more power supply input ports of the processor.

An enable signal from the processor core of processor 100 of FIG. 2 is provided to the input of level shifter 202. An input of comparator 200 is coupled to resistor ladder 211. The output of comparator 200 is coupled to one of the inputs of AND gate 201, and the other input of AND gate 201 is coupled to the output of level shifter 202. The output of AND gate 201 is coupled to the control input of output driver 203, and the input of output driver 203 receives an output signal from the processor core of processor 100. The output of output driver 203 is coupled to external system bus 180 via an I-O port (such as an electrically conductive pin or pad) on processor 100. ESD protection device 212 is coupled between the output of output driver 203 and the I-O port of processor 100.

Resistor ladder 211 is used to set a reference voltage derived from I-O power supply 140. This reference voltage is provided to the reference input of comparator 200. The other input of comparator 200 is coupled to core power supply 150 via a power supply input port of processor 100. Comparator 200 compares the core power supply voltage to the reference voltage. If the core power supply voltage exceeds the reference voltage, comparator 200 activates a power_good signal that indicates that the core power supply voltage is greater than the reference voltage. If the core power supply voltage does not exceed the reference voltage, the power_good signal is not activated.

For one embodiment of the present invention, the reference voltage is set to the minimum nominal operating voltage of the processor core (plus some small guardband, if desired). For this embodiment, an active power_good signal indicates that the core power supply is operational. For an alternate embodiment of the present invention, an additional comparator is used to determine if the core power supply voltage from core power supply 150 of FIG. 2 exceeds the maximum nominal operating voltage of the processor core (plus some small guardband, if desired). For this embodiment, the output of the additional comparator is ANDed by an AND gate with the output of comparator 200. The output of this AND gate is the power_good signal indicating that the core power supply is operational.

For an alternate embodiment of the present invention in which core power supply 150 of FIG. 2 provides a negative voltage to the processor core, the comparator activates a power_good signal that indicates that the core power supply voltage is less than the reference voltage. For another embodiment, comparator 200 and resistor ladder 211 are removed, and core power supply 150 is coupled directly to an input of AND gate 201 via a power supply input port of processor 100. For this embodiment, the reference voltage to which the core power supply voltage is effectively being compared is the trigger voltage (or threshold voltage) of AND gate 201. If the voltage from core power supply 150 exceeds the trigger voltage of AND gate 201, AND gate 201 registers the core power supply voltage as a power_good signal, indicating that core power supply 150 is operational. If the voltage from core power supply 150 is less than the trigger voltage of AND gate 201, this indicates that core power supply 150 has failed.

Level shifter 202 of FIG. 2 is included for an embodiment in which the core power supply voltage is different than the I-O power supply voltage. Level shifter 202 converts the voltage range of the enable signal from the processor core to the voltage range needed at the input to AND gate 201. For example, if core power supply 150 provides a voltage of 1.5V, and I-O power supply 140 provides a voltage of 5V, level shifter 202 converts the voltage range of 0–1.5V to the range of 0–5V. For an alternate embodiment of the present invention in which the core power supply voltage is approximately equal to the I-O power supply voltage, level shifter 202 may be eliminated.

The enable signal from the processor core of processor 100 of FIG. 2 is provided (via level shifter 202 for the embodiment of FIG. 2) to an input of AND gate 201. The enable signal, when active, indicates that processor 100 has gained ownership of system bus 180, and may send output signals onto the bus.

The output of AND gate 201 of FIG. 2 is a driving signal that is provided to the control input of output driver 203. When active, the driving signal causes output driver 203 to transfer the output signal from the processor core to external system bus 180 via an I-O port of processor 100. When the driving signal is inactive, the processor core is electrically isolated from system bus 180.

AND gate 201 of FIG. 2 only actives the driving signal when both the power_good signal is active and the enable signal is active. Therefore, the driving signal indicates that core power supply 150 is operational and the processor has control of system bus 180. If core power supply 150 fails, the driving signal is not activated. This prevents processor 100 from loading the system bus upon failure of its core power supply.

For an alternate embodiment of the present invention, AND gate 201 of FIG. 2 may be any other logic gate having a driving signal as its output. For example, for an embodiment in which the driving signal is active low, AND gate 201 may be replaced by a NAND gate. For an embodiment in which in which the power_good or enable signals are active low, AND gate 201 may include inverting inputs.

Alternatively, AND gate 201 may be replaced by a NOR gate with inverting inputs.

As stated above, output driver 203, when turned on by an active driving signal applied to its control input, transfers an output signal from the processor core of processor 100 of FIG. 2 to system bus 180 via an I-O port of the processor. For one embodiment of the present invention, output driver 203 may include one or more inverters.

ESD protection device 212 of FIG. 2 comprises two diodes biased such that the diodes are reversed-biased under normal operating conditions. When a voltage on system bus 180 exceeds the voltage supplied by I-O power supply 140, such as during a positive ESD event, the upper diode becomes forward-biased and drains the excess voltage to I-O power supply 140. When a voltage on system bus 180 falls below $V_{ss}$ (or ground, if $V_{ss}$ is grounded), such as during a negative ESD event, the lower diode becomes forward-biased and raises the voltage back up to $V_{ss}$. For an alternate embodiment of the present invention, different ESD protection devices may be used, including, for example, ESD devices made of parasitic devices existing in the output (or input) driver. To reduce the likelihood that failure of core power supply 150 will cause failure of the computer system by loading bus 180, however, alternate ESD protection devices should be supplied with power from the I-O power supply rather than the core power supply.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A circuit to transfer an output signal comprising:

a component to be powered by a first power supply, the component to activate a driving signal that indicates that both a second power supply voltage has a magnitude greater than a reference voltage and an enable signal is active; and a driver to transfer the output signal when the driving signal is active.

2. The circuit of claim 1, further comprising a comparator to be powered by the first power supply, the comparator to activate a signal that indicates to the component that the second power supply voltage has a magnitude greater than the reference voltage.

3. The circuit of claim 2, wherein the reference voltage is to be derived from the first power supply using a resistor ladder coupled to the comparator.

4. The circuit of claim 1, further comprising an electrostatic discharge protection device to be powered by the first power supply and coupled to the driver.

5. The circuit of claim 1, wherein the component is an AND gate.

6. The circuit of claim 5, wherein one input to the AND gate is to be coupled to the second power supply and the reference voltage is a trigger voltage of the AND gate.

7. The circuit of claim 1, wherein the reference voltage is approximately a minimum nominal operating voltage of a processor core to which the circuit is coupled.

8. The circuit of claim 1, wherein the first power supply is an I/O power supply and the second power supply is a core power supply.

9. The circuit of claim 1, wherein the driver is to be powered by the first power supply.

10. A processor comprising:

a core coupled to a core power supply input port;

a driver coupled to an I/O power supply input port, the driver having an input coupled to the core, an output coupled to an I/O port, and a control input; and a logic gate having an output coupled to the control input of the driver, the logic gate to output a driving signal that indicates that the core power supply is operational.

11. The processor of claim 10, further comprising a comparator to output a signal that indicates to the logic gate that the core power supply is operational.

12. The processor of claim 11, wherein the logic gate includes an AND gate having a first input to receive the signal indicating that the core power supply is operational and a second input to receive an enable signal from the core.

13. The processor of claim 10, further comprising a first electrostatic discharge protection device coupled between the I/O port and the I/O power supply input port, and a second electrostatic discharge protection device coupled between the I/O port and $V_{ss}$.

14. The processor of claim 10, wherein the driving signal further indicates that an enable signal from the core is active.

15. A processor comprising:

a core coupled to a core power supply input port; and a bus isolation circuit coupled to an I/O power supply input port, the circuit preventing the processor from loading an external bus if a core power supply fails.

16. The processor of claim 15, wherein the bus isolation circuit comprises a logic gate coupled to the I/O power supply input port, the logic gate to activate a driving signal that indicates that both the core power supply is operational and an enable signal is active.

17. The processor of claim 16, wherein the bus isolation circuit further comprises a driver coupled to the I/O power supply input port, the driver to transfer an output signal from the core to an I/O port when the driving signal is active.

18. The processor of claim 17, further comprising a first electrostatic discharge protection device coupled between the I/O port and the I/O power supply input port, and a second electrostatic discharge protection device coupled between the I/O port and $V_{ss}$.

19. A computer system comprising:

a first core power supply coupled to a first processor;

a second core power supply coupled to a second processor, the second processor being coupled to the first processor via a system bus;

an I/O power supply coupled to both the first and second processors;

a first bus isolation circuit coupled to the I/O power supply, the first bus isolation circuit preventing the first processor from loading the system bus when the first core power supply fails; and a second bus isolation circuit coupled to the I/O power supply, the second bus isolation circuit preventing the second processor from loading the system bus when the second core power supply fails.

20. The system of claim 19, further comprising a plurality of additional core power supplies coupled to each of a plurality of additional processors.

21. The system of claim 19, wherein the first and second bus isolation circuits are disposed within the first and second processors, respectively.

22. The system of claim 19, wherein the first bus isolation circuit comprises a driver coupled to the I/O power supply, the driver to transfer an output signal to the system bus when both the first core power supply is operational and the first processor gains ownership of the system bus.

* * * * *